(12) United States Patent
Retolaza et al.

(10) Patent No.: US 7,818,977 B2
(45) Date of Patent: Oct. 26, 2010

(54) ROTARY ABSORPTION HEAT PUMP

(75) Inventors: Xabier Gorritxategi Retolaza, Durango (ES); Unai Oñederra Egaña, San Sebastian (ES); José Manuel Cano Rodríguez, Mondragon (ES)

(73) Assignee: Fagor, S. Coop, Mondragón (ES)

( * ) Notice: Subject to any disclaimer, the term of this patent is extended or adjusted under 35 U.S.C. 154(b) by 1195 days.

(21) Appl. No.: 10/580,009

(22) PCT Filed: Nov. 21, 2003

(86) PCT No.: PCT/ES03/00590

§ 371 (c)(1),
(2), (4) Date: May 19, 2006

(87) PCT Pub. No.: WO2005/050106

PCT Pub. Date: Jun. 2, 2005

(65) Prior Publication Data

US 2008/0314069 A1 Dec. 25, 2008

(51) Int. Cl.
*F25B 15/00* (2006.01)
(52) U.S. Cl. ............................. 62/476; 62/481; 62/499
(58) Field of Classification Search .............. 62/476, 62/499, 478, 481, 105, 106, 101, 324.2; 165/81, 165/86
See application file for complete search history.

(56) References Cited

U.S. PATENT DOCUMENTS

| | | | |
|---|---|---|---|
| 3,508,402 A * | 4/1970 | Gray et al. ................ | 376/402 |
| 4,441,337 A | 4/1984 | Kantor | |
| 5,009,085 A * | 4/1991 | Ramshaw et al. .............. | 62/476 |
| 5,303,565 A | 4/1994 | Pravda | |
| 5,617,737 A * | 4/1997 | Christensen et al. .......... | 62/487 |
| 5,901,568 A * | 5/1999 | Haga .......................... | 62/324.6 |
| 6,035,650 A | 3/2000 | Winnington et al. | |
| 6,158,237 A * | 12/2000 | Riffat et al. ................... | 62/484 |
| 6,263,682 B1 * | 7/2001 | Winnington et al. .......... | 62/105 |

FOREIGN PATENT DOCUMENTS

| | | |
|---|---|---|
| EP | 0448203 A1 | 9/1991 |
| EP | 0855008 B1 | 7/1998 |
| ES | 2103258 | 9/1997 |
| JP | 000-274831 A * | 10/2000 |

OTHER PUBLICATIONS

Abstract of JP 2000-274831 A to Nobuyuki et al.*
International Search Report for International Application No. PCT/ES03/00590, Feb. 20, 2004, Madrid.

* cited by examiner

*Primary Examiner*—Mohammad M Ali
(74) *Attorney, Agent, or Firm*—Peter B. Scull; Kristina M. Kalan; Berenbaum Weinshienk PC

(57) ABSTRACT

Rotary absorption heat pump that comprises a rotary unit (1) that comprises a vapour generator (2), a condenser (3), an evaporator (4) and an absorber (5) interconnected to constitute fluid flow trajectories for a volatile fluid component and a liquid absorbing it. The heat pump also comprises heat transmission means for transmitting heat to the vapour generator (2), said heat transmission means comprising a heat exchanger (6) disposed in the rotary unit (1) through which a hot fluid flows, said heat transmission means also comprising adaptor means in order to transfer said hot fluid from a static environment to said heat exchanger (6).

19 Claims, 4 Drawing Sheets

ROTARY ABSORPTION HEAT PUMP

TECHNICAL FIELD

The present invention relates to heat pumps operated by rotary absorption cycle, including single effect pumps and double effect pumps.

PRIOR ART

Mechanical compression pumps that are operated by the principle of the mechanical recompression of cooling vapour conducted in a compressor are known. Vapour compressed at high pressure is condensed into liquid in a condenser where it dissipates heat. From there, through an expansion valve, the liquid expands at a low pressure and temperature, and from there it evaporates into an evaporator, where coldness is produced, or more precisely, heat is absorbed from the atmosphere. The cycle in the compressor then begins again.

Heat pumps operated by absorption cycle are activated thermally, i.e. they obtain cooling vapour that is condensed (in order to obtain heat), and then evaporated (to obtain coldness) through the application of a heat source. Thus, in this type of heat pump, the function of the compressor is performed by a generator heated by the action of a heat source. Furthermore, the function of the expansion valve is conducted by an absorber.

In heat pumps operated by rotary absorption cycle the entire cycle is rotated so that the heat transference processes are made more intense. In addition, this rotation is inverted when the pumping of the solution between the chambers of the heat pump is performed.

ES 2 103 258 T3 describes a heat pump operated by rotary absorption cycle activated by gas combustion. Said heat pump comprises a rotary unit that includes a vapour generator to which heat is transmitted. The transmission of heat by gas combustion from the heat source to the vapour generator is conducted by radiation, as a result of which there is no physical contact between said heat source and said vapour generator. As a consequence, although the vapour generator rotates along with the rotary unit, the heat source can remain fixed.

EP 0 855 008 B1 discloses a double effect heat pump operated by rotary absorption cycle, also activated by gas combustion. In the double effect system an added cooling effect is achieved by introducing an intermediate condenser and an intermediate generator.

DESCRIPTION OF THE INVENTION

The main object of the invention is to provide a rotary absorption heat pump that can be activated by any thermal source.

The inventive heat pump comprises a rotary unit that includes a vapour generator, a condenser, an evaporator and an absorber connected to each other in order to constitute fluid flow trajectories for a volatile fluid component and a liquid absorbing it, and also comprises heat transmission means for transmitting heat to the vapour generator. Said heat transmission means comprise a heat exchanger disposed in the rotary unit through which a hot fluid flows.

The hot fluid that flows through the heat exchanger is heated by an external heat source. So, the heat transmission means of the inventive heat pump also comprise adaptor means in order to transfer said hot fluid from a static environment, external to what is the rotary unit itself, to the heat exchanger.

The inventive heat pump can be both single effect and double effect.

With the inventive heat pump, given that the transmission of heat to the heat generator is conducted by a hot fluid, it is possible to use, in order to generate heat, any thermal source capable of heating the fluid to the necessary temperature, the use of, for example, solar panels, machine and engine cooling systems, etc. being possible.

These and other advantages and characteristics of the invention will be made evident in the light of the drawings and the detailed description thereof.

DETAILED DISCLOSURE OF THE INVENTION

Figure 1:
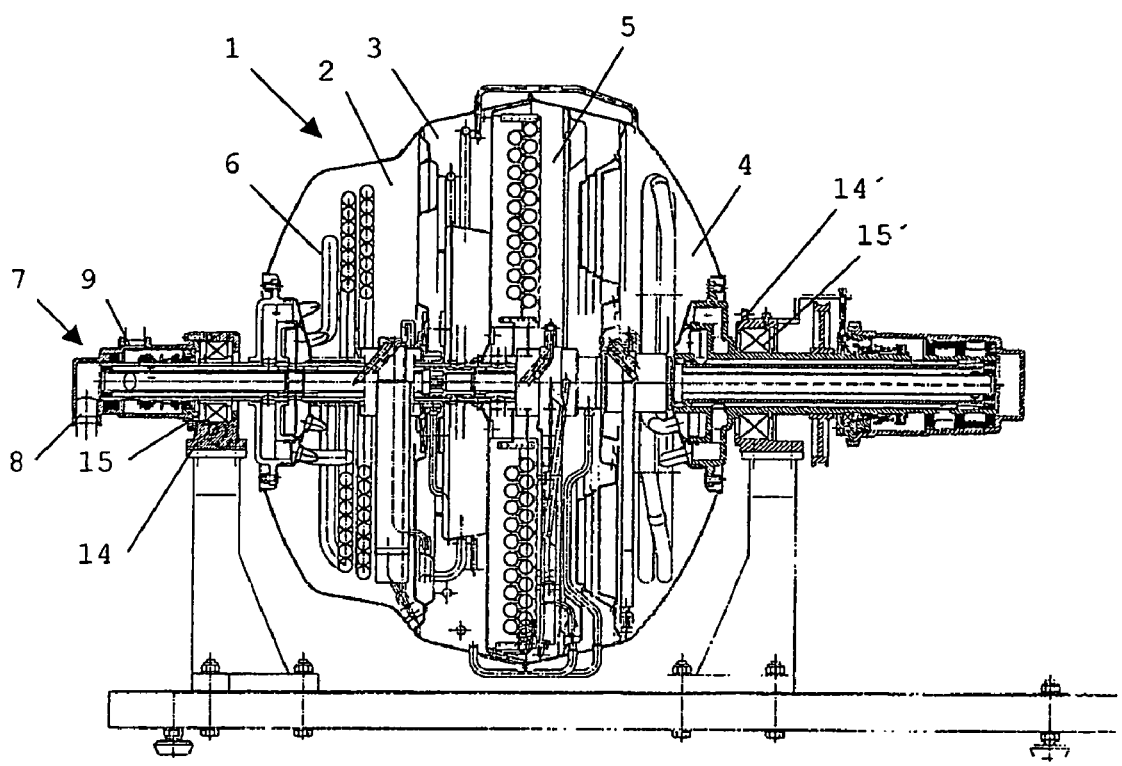
FIG. 1 is a view in section of an embodiment of the invention.

The embodiment of the invention of FIG. 1 corresponds to a single effect heat pump operated by rotary absorption cycle. The heat pump of said embodiment comprises a rotary unit 1 that includes:
a vapour generator 2,
a condenser 3,
an absorber 5, and
an evaporator 4.

The inventive heat pump can also be a double effect pump, in which case it would also comprise a second condenser and a second generator.

The inventive heat pump comprises heat transmission means for transmitting heat to the vapour generator 2, said heat transmission means comprising a heat exchanger 6 disposed in the rotary unit 1. The transmission of heat is conducted through the hot fluid that flows through the heat exchanger 6. The heat exchanger 6 is irrigated on the exterior by the solution that circulates in the rotary absorption cycle, and the heat of the hot fluid that circulates in the interior of the heat exchanger 6 is transferred by convection and conduction, thereby permitting the evaporation of the volatile part of said solution.

The heat exchanger 6 comprises a spiral pipe, said spiral pipe being corrugated internally and externally. By means of said corrugated surfaces the heat exchange surface is increased and the nucleation of the water vapour is encouraged. The rotation of the film of the solution on the corrugated surface of the heat exchanger 6 contributes to the increase in the efficiency of the vapour generator 2, thereby obtaining a vapour generator 2 with a high heat transmission coefficient.

The spiral pipe can be made of copper, nickel-plated copper or copper-nickel. In a preferred embodiment, said spiral pipe is made of nickel-plated copper or copper-nickel, as at temperatures of above 90° C. there is a risk of corrosion when the solution comes into contact with the copper. The nickel protects the copper from corrosion.

Given that the hot fluid has to be transferred to the rotary unit 1 from a static environment, the heat transmission means comprise adaptor means to make said transfer of hot fluid possible.

Figure 2:
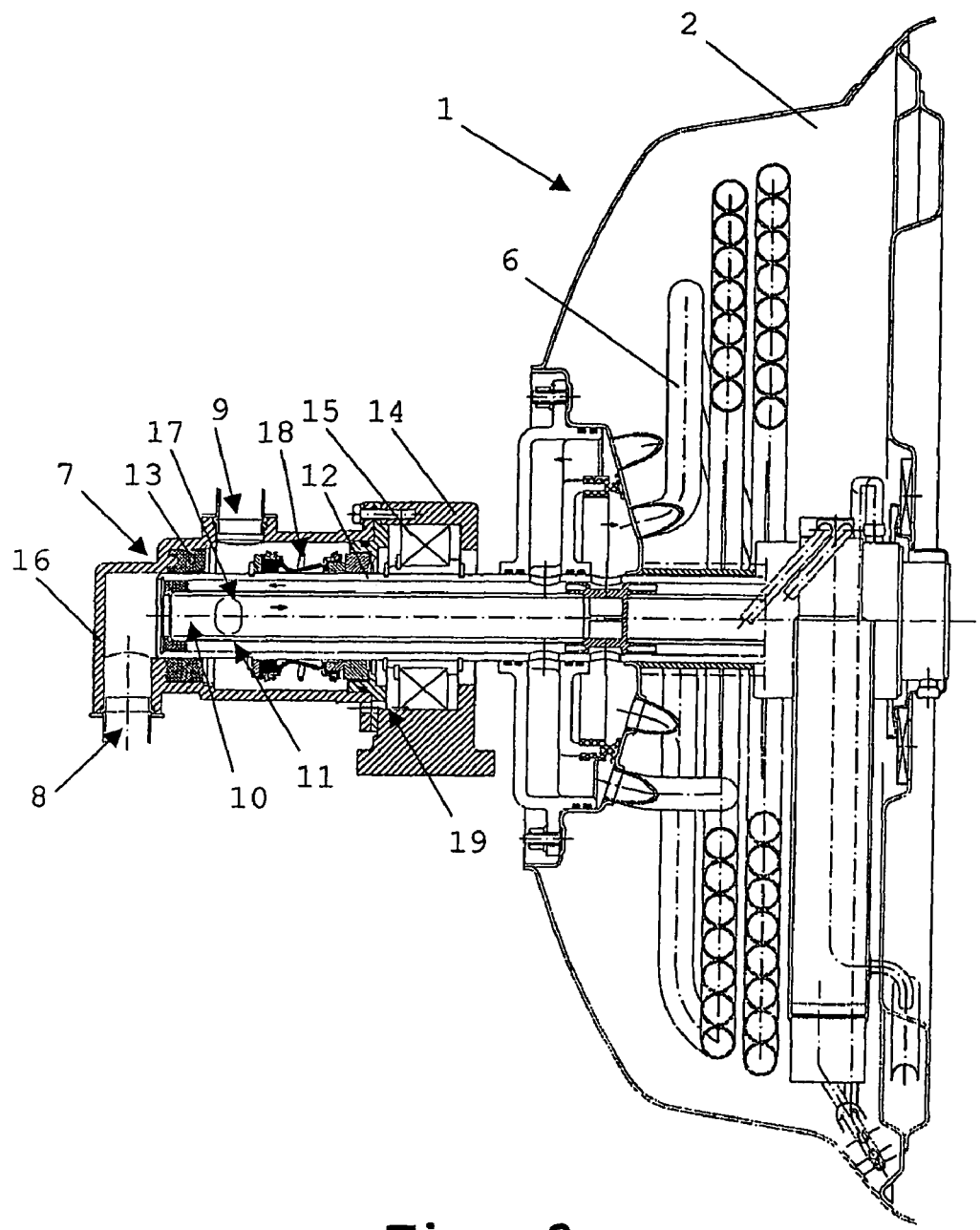
FIG. 2 is a view in section of the heat transmission means and the vapour generator of the embodiment of FIG. 1.
Figure 3:
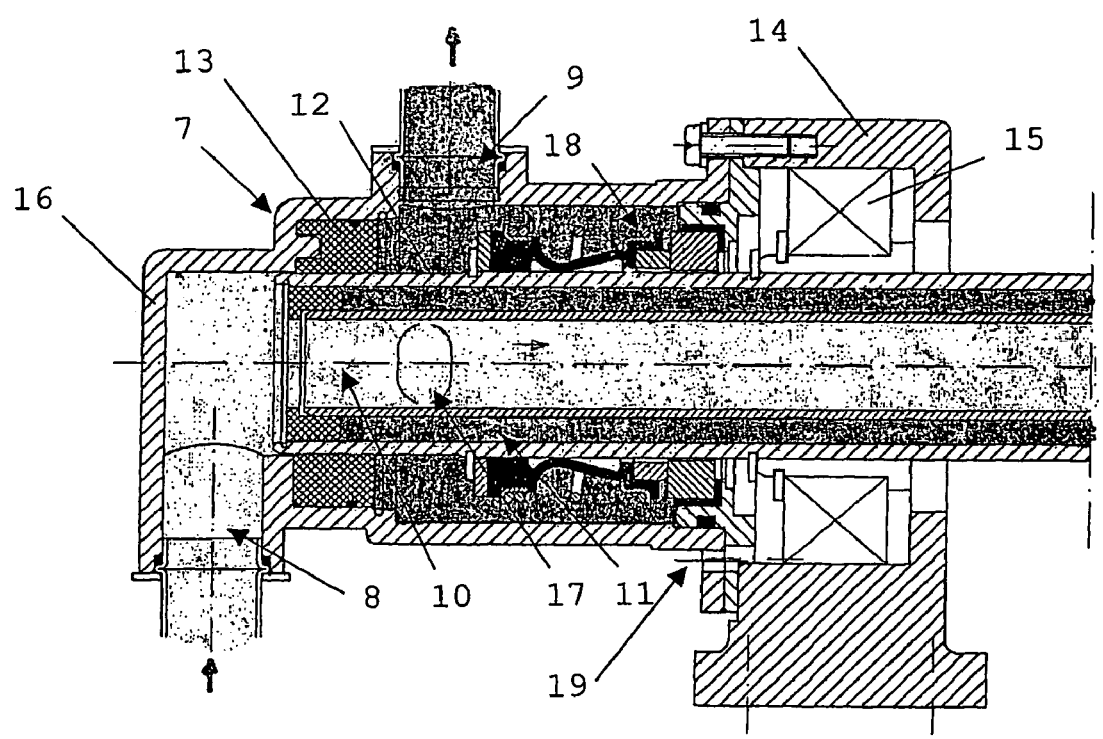
FIG. 3 is a view in section of an embodiment of the adaptor means for transferring hot fluid from a static environment to the rotary unit of the inventive heat pump.

The heat transmission means, shown in greater detail in FIGS. 2 and 3, also comprise an inlet conduit 8 and an outlet conduit 9 for the hot fluid disposed in the static environment, and an inlet conduit 10 and an outlet conduit 11 disposed coaxially on the rotation axis 12 of the rotary unit 1. Said inlet and outlet conduits 10 and 11 connect the inlet and outlet conduits 8 and 9 of the static environment with the heat exchanger 6. The adaptor means comprise a rotary seal 7 that links the static environment with the rotation axis 12 of the rotary unit 1.

The rotary unit 7 comprises a bushing 13 made of low-friction material. In a preferred embodiment, said bushing 13 is made of graphite, although it can also be made of carbon or polymers of varying degrees. The bushing 13 is disposed between the static environment and the end of the rotation axis 12 of the rotary unit 1. In this way, it is not necessary to use bearings in said rotary seal 7, as a consequence of which the invention avoids the problem deriving from the short life the bearings would have in an environment at such high temperatures, as the hot fluid, in order to generate vapour, must be at a temperature of over 90° C. if the pump is a single effect pump, and at a temperature of over 180° C. if it is a double effect pump. In addition, the maintenance tasks necessary in the case of using bearings are avoided.

The inlet conduit 10 of the rotation axis 12 is in the interior of the outlet conduit 11. The end of said inlet conduit 10 is connected to the inlet conduit 8 of the static environment, and the outlet conduit 11 is connected to the outlet conduit 9 of the static environment through a hole 17 disposed on the surface of the rotation axis 12. The bushing 13 separates the hot fluid that enters the inlet conduit 10 from the hot fluid that exits the outlet conduit 11. Between the bushing 13 and the rotation axis 12 is generated a film of fluid that acts as a lubricant.

As shown in FIG. 1, the rotary unit 1 is secured, on both sides of its rotation axis 12, by a support 14 with its respective bearings 15 and by a support 14' with its respective bearings 15'. As shown in detail in FIG. 3, the heat transmission means comprise a casing 16 attached to the support 14, said casing 16 comprising the inlet conduit 8 and the outlet conduit 9 of the static environment, and with the bushing 13 being fixed to the interior of said casing 16. In this embodiment, said casing 16 is made of plastic.

The heat pump also comprises a mechanical fastening 18 that prevents hot fluid from reaching the bearings 15 of the support 14. If hot fluid still manages to reach them, the support 14 comprises a hole 19 to remove said hot fluid.

By rotating the rotary unit 1, the inventive heat pump is made to function at greater cooling temperatures than static heat pumps. This means that in the inventive heat pump the air acts as a heat dissipator and cooling towers can be dispensed with, which is important bearing in mind that serious doubts are now being raised about cooling towers because of the health problems they cause. In the inventive heat pump, instead of a cooling tower an external exchanger is used and is cooled by air by means of which the heat generated in the absorber 5 and in the condenser 3 is dissipated.

Figure 4:
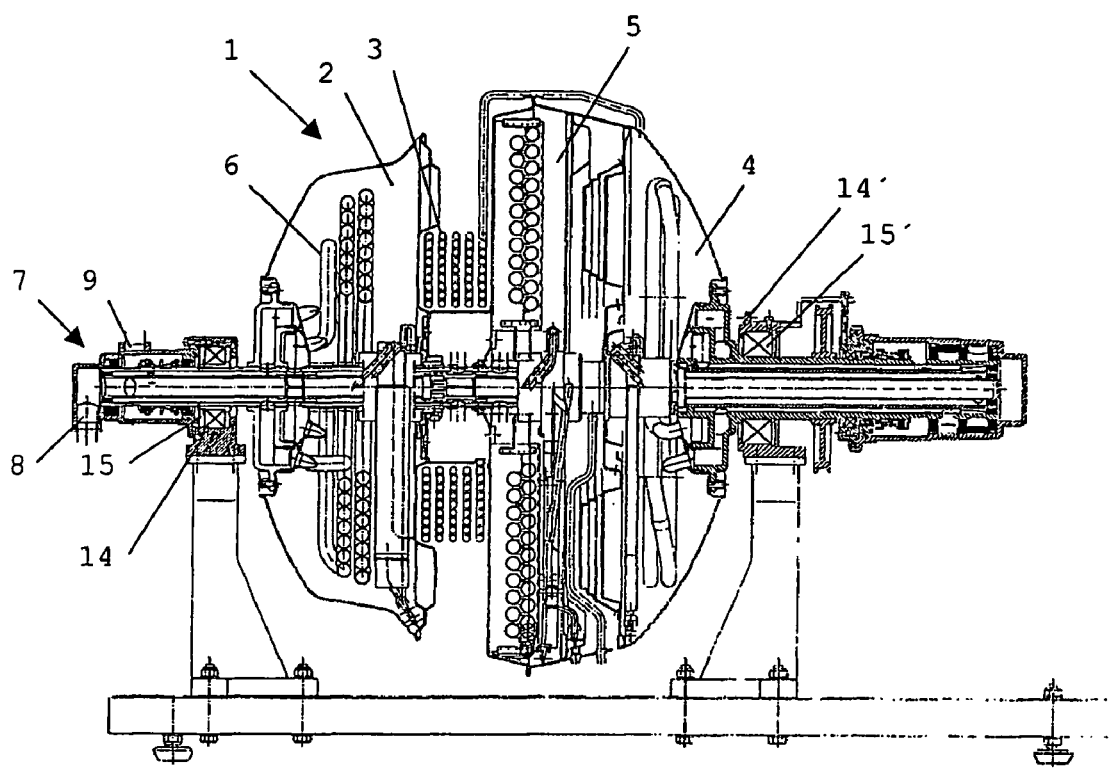
FIG. 4 is a view in section of an embodiment of the invention in which the condenser is in direct contact with the exterior.

In a preferred embodiment, shown in FIG. 4, the temperature of the vapour generator 2 can be reduced by putting the condenser 3 in direct contact with the exterior. This consequently brings about the direct cooling of the condenser 3 using air from the exterior, thereby reducing the condensation temperature significantly. Thus, temperatures can be achieved close to those achieved in the case of using a cooling tower. In addition, as the condenser 3 is in direct contact with the exterior, the amount of heat to be dissipated in the external exchanger is reduced.

The invention claimed is:

1. A rotary absorption heat pump comprising:
a rotary unit comprising a housing having an interior surface and an exterior surface and an internal cavity substantially defined by the interior surface of the housing, the internal cavity containing a vapour generator, a condenser, an evaporator, and an absorber that are interconnected to constitute fluid flow paths for a volatile fluid component and a liquid absorbing it, the vapour generator comprising a heat exchanger having internal and external heat exchange surfaces, the internal and external heat exchanger surfaces located completely within the internal cavity of the rotary unit with no portion of the external heat exchanger surface making contact with the interior surface of the housing, the heat exchanger comprising a thermally conductive fluid conduit adapted to receive a heating medium from a heat source external to the exterior surface of the housing of the rotary unit.

2. The heat pump according to claim 1, further comprising a heating medium static inlet and a heating medium static outlet for receiving and expelling the heating medium from the rotary unit, respectively, and a rotary inlet conduit disposed along a rotary axle of the rotary unit and in fluid communication with the static inlet for delivering the heating medium to the heat exchanger and a rotary outlet conduit disposed coaxially to the rotary inlet conduit for receiving the heating medium from the heat exchanger and delivering the heating medium to the static outlet.

3. The heat pump according to claim 2, wherein the rotary inlet conduit is disposed within the rotary axle, the heat pump further comprising a rotary seal at an end of the rotary axle where the static inlet and the rotary inlet conduit meet.

4. The heat pump according to claim 3, wherein the rotary seal comprises a bushing made of a low-friction material.

5. The heat pump according to claim 3, wherein the rotary inlet conduit is in the interior of the rotary outlet conduit, the end of said rotary inlet conduit being located at the end of the rotary axle and connected to the static inlet, the rotary outlet conduit connected by a hole disposed on the surface of the rotary axle to the static outlet, the rotary seal separating the heating medium that enters the rotary inlet conduit from the heating medium that exits the rotary outlet conduit.

6. The heat pump according to claim 5, wherein the rotary axle is rotationally connected to bearings located on or within a support structure, the heat pump further comprising a casing attached to said support, said casing comprising the static inlet and the static outlet, the rotary seal being fixed to an interior of said casing.

7. The heat pump according to claim 6, wherein said heat pump further comprises a mechanical fastening that prevents the heating medium from reaching the bearings.

8. The heat pump according to claim 1, wherein the heat exchanger comprises a spiral pipe, said spiral pipe being corrugated internally and externally.

9. The heat pump according to claim 8, wherein the heat exchanger is made of nickel-plated copper.

10. The heat pump according to claim 1, wherein at least a portion of the condenser is in direct contact with the environment exterior to the rotary unit so that there is direct cooling of the condenser via the exterior environment.

11. The heat pump according to claim 2, wherein the rotary seal comprises a bushing made of a low-friction material.

12. The heat pump according to claim 2, wherein the rotary inlet conduit is in the interior of the rotary outlet conduit, the end of said rotary inlet conduit being located at the end of the rotary axle and connected to the static inlet, the rotary outlet conduit connected by a hole disposed on the surface of the rotary axle to the static outlet, the rotary seal separating the heating medium that enters the rotary inlet conduit from the heating medium that exits the rotary outlet conduit.

13. The heat pump according to claim 12, wherein the rotary axle is rotationally connected to bearings located on or within a support structure, the heat pump further comprising a casing attached to said support, said casing comprising the static inlet and the static outlet, the rotary seal being fixed to an interior of said casing.

14. The heat pump according to claim 13, wherein said heat pump further comprises a mechanical fastening that prevents the heating medium from reaching the bearings.

15. A rotary absorption heat pump comprising:
a rotary unit having an interior, the interior containing a vapour generator, a condenser, an evaporator, and an absorber that are interconnected to constitute fluid flow paths for a volatile fluid component and a liquid absorbing it, the vapour generator comprising a heat exchanger that is located within the interior of the rotary unit, the heat exchanger comprising a thermally conductive fluid conduit adapted to receive a heating medium from a heat source external to the interior of the rotary unit, the heat pump comprising a heating medium static inlet and a heating medium static outlet for receiving and expelling the heating medium from the rotary unit, respectively, and a rotary inlet conduit disposed along a rotary axle of the rotary unit and in fluid communication with the static inlet for delivering the heating medium to the heat exchanger and a rotary outlet conduit disposed coaxially to the rotary inlet conduit for receiving the heating medium from the heat exchanger and delivering the heating medium to the static outlet.

16. The heat pump according to claim 15, wherein the rotary inlet conduit is disposed within the rotary axle, the heat pump further comprising a rotary seal at an end of the rotary axle where the static inlet and the rotary inlet conduit meet.

17. The heat pump according to claim 15, wherein the heat exchanger comprises a spiral pipe, said spiral pipe being corrugated internally and externally.

18. The heat pump according to claim 17, wherein the heat exchanger is made of nickel-plated copper.

19. The heat pump according to claim 15, wherein at least a portion of the condenser is in direct contact with the environment exterior to the rotary unit so that there is direct cooling of the condenser via the exterior environment.

* * * * *